Figure 1:
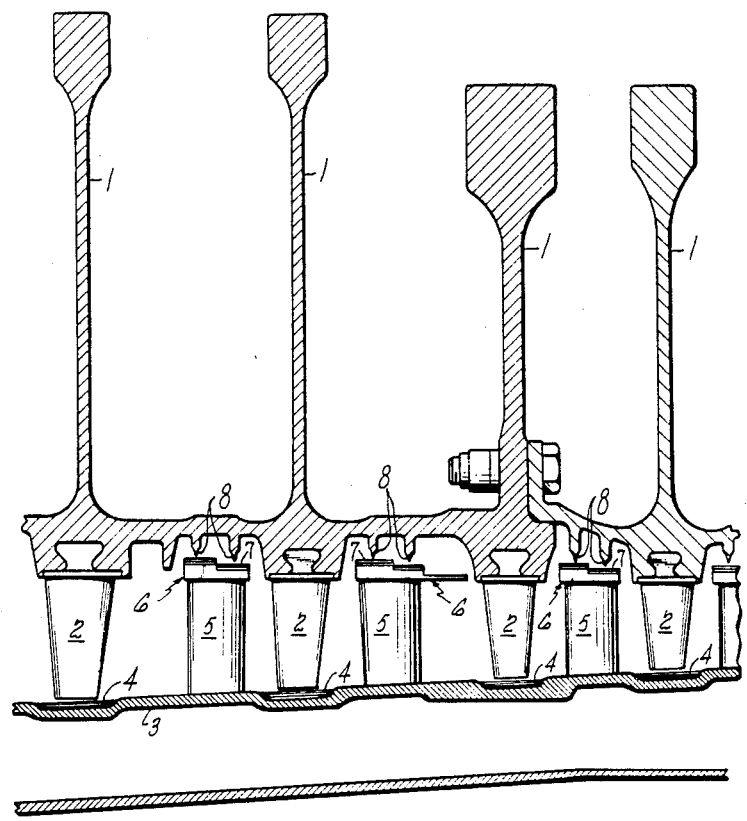

United States Patent [19]

Vine et al.

[11] Patent Number: 4,936,745
[45] Date of Patent: Jun. 26, 1990

[54] THIN ABRADABLE CERAMIC AIR SEAL

[75] Inventors: Raymond W. Vine, East Hartford; Donald A. Robbins, South Windsor; Donald G. Nordstrom, Meriden; Mark B. Goodstein, Windsor Locks, all of Conn.

[73] Assignee: United Technologies Corporation, Hartford, Conn.

[21] Appl. No.: 285,169

[22] Filed: Dec. 16, 1988

[51] Int. Cl.$^5$ ................................................ F01D 5/20
[52] U.S. Cl. ............................ 415/173.4; 415/174.4; 416/174
[58] Field of Search .............. 415/173.4, 174.4, 173.6; 416/92, 228, 174 A

[56] References Cited

U.S. PATENT DOCUMENTS

| | | | |
|---|---|---|---|
| 3,964,877 | 6/1976 | Bessen et al. | 415/173.4 X |
| 3,975,165 | 8/1976 | Elbert et al. | 415/173.4 X |
| 4,269,903 | 5/1981 | Clingman et al. | 415/173.4 X |
| 4,336,276 | 6/1982 | Bill et al. | 415/173.4 X |
| 4,405,284 | 9/1983 | Albrecht et al. | 415/174.4 |
| 4,566,700 | 1/1986 | Shiembob | 277/53 |
| 4,588,607 | 5/1986 | Matarese et al. | 415/173.4 X |
| 4,741,973 | 5/1988 | Condit et al. | 428/553 |
| 4,744,725 | 5/1988 | Matarese et al. | 415/173.4 |

Primary Examiner—Everette A. Powell, Jr.
Attorney, Agent, or Firm—Charles E. Sohl

[57] ABSTRACT

An abradable coating is described for interaction with a abrasive gas turbine engine component to provide sealing. The abradable coating comprises yttria stabilized zirconia with intentional porosity which is applied by plasma spraying to a MCrAlY bond coat which in turn rest on a superalloy substrate. The coating system is applied by plasma spraying. The coating system is adapted to interact with an abrasive coated abrasive treated gas turbine engine component.

1 Claim, 1 Drawing Sheet

THIN ABRADABLE CERAMIC AIR SEAL

Description

1. Technical Field

This invention relates to the field of ceramic air seals for use in the turbine section of gas turbine engines. This invention also relates to the field of two-layer ceramic-metal bond coat abradable coatings.

2. Background Art

Gas turbine engines are widely used as sources of motive power, particularly for aircraft propulsion. In a gas turbine engine air is ingested into the front end of the engine and compressed to conditions of relatively high temperature and pressure. This compressed air is then mixed with combustible fuel and burned and the products of combustion passed through a turbine section which removes most of the energy from the products of combustion. Gas turbine engine efficiency is of great importance because of its impact on economics and on the range an aircraft can safely fly without needing to refuel.

Modern large gas turbine engines employ axial compressors and turbines An axial flow stage comprises a plurality of airfoils mounted radially at the periphery of a disk which is secured to a shaft. In the compressor section the airfoils act on the air to compress it whereas in the turbine section the products of combustion act on the turbine blade to cause rotation. Axial flow stages are surrounded by a case structure which serves in part to eliminate the leakage of flow around the free ends of the blades. Such leakage is wasteful and reduces efficiency. Modern gas turbine engine designers have gone to great lengths to devise useful sealing structures which generally comprise an abradable coating on the case surface, usually in combination with a blade tip treatment which renders the blade tips hard and resistant to wear. In use the blade tips cut a path into the abradable coating and provide sealing.

DISCLOSURE OF INVENTION

The present invention relates to seals having particular utility in gas turbine engines, particularly those of the axial flow type. Such engines include alternate rows of stationary vanes and moving blades with the blades being attached at the periphery of shaft mounted rotating disks.

FIG. 1 illustrates a cross-section of a portion of a modern gas turbine engine. Components important to understanding the present invention include a plurality of rotatable disks 1 upon whose outer periphery are mounted a plurality of blades 2. The blades rotate within the inner case 3 and are closely spaced thereto. Minimum leakage between the blades and the inner case is achieved by the provision of a seal 4 (the outer air seal), mounted on the inner case.

Mounted within and upon the inner case 3 are a plurality of vanes 5 on whose inner, free ends 6 is mounted another seal 7 (the inner air seal) which is closely spaced to knife edges 8 mounted on extensions of the disks 1. The knife edge 8 and inner air seal 7 cooperate to reduce leakage and improve efficiency. In an alternate engine scheme, the disks do not have integral projections, but are separated by spacers upon which knife edges may be mounted.

The seals for which the present invention is particularly suited are located on the inner case 3 adjacent the free ends of the blades 2 (the outer air seal), and on the free ends 6 of the vanes 5 (the inner air seal). The seals of the present invention are preferably mounted on stationary substrates arranged to engage moving components.

The present invention is directed at turbine sealing structures which have taken a variety of forms in prior art. U.S. Pat. Nos. 4,481,237 and 4,588,607 indicate some of the more currently favored approaches wherein complex plasma sprayed structures are devised varying in composition from metal at one surface to ceramic at an outer surface with variations in composition, stress and porosity in between. These structures usually have a thickness on the order of 0.150 inch and are costly because of the need to carefully control the substrate temperature and plasma spray conditions, during the deposition of many layers, to achieve the correct abradable and durable structure. Such thick seal structures will spall and fail if the deposition parameters are not followed closely. Likewise in service these seals with their built-in varying stresses are subject to foreign object damage. When failure of thick seals does occur excess leakage results through the resulting wide gap.

Accordingly, it is an object of the present invention to describe an abradable ceramic seal system in which the thickness of the overall system is reduced to 50 mils and preferably to about 30 mils It is another object of the present invention to describe a two-layer ungraded abradable ceramic coating system in which there are no changes in composition or porosity except for the single change which occurs at the interface between the bond coat and the outer ceramic coating.

It is another object of the invention to describe a simple two-layer ceramic abradable coating system which can be applied without the necessity of critical substrate temperature control during seal application.

The foregoing and other features and advantages of the present invention will become more apparent from the following description.

Best Mode for Carrying Out the Invention

According to the invention an abradable plasma sprayed ceramic coating system is applied to a metal substrate or seal shoe. This substrate is made of a conventional nickel or cobalt base superalloy by casting and machining to size. On this substrate is applied a bond coat of an MCrAlY material. In the context of this application MCrAlY means the well known metal coating systems in which M may comprise nickel, cobalt, iron, mixtures of nickel and cobalt; Cr comprises chromium; Al comprises aluminum; and Y comprises yttrium. Minor amounts of additional elements such as platinum, silicon, and hafnium may be made without deviating from the invention. More specifically the preferred MCrAlY composition is that taught in U.S. Pat. No. 4,585,481, see also U.S. Pat. Nos. 3,676,080, 3,754,903, and 3,928,026 which are incorporated by reference.

This MCrAlY bond coat is applied using so-called low pressure plasma sprayed technique in which the plasma spray gun and the substrate are both located in a chamber which is adapted to have its atmosphere reduced to about 10 mm Hg during the spraying process. Use of this technique provides a high quality, high integrity bond coat. The preferred particle size for the bond coat is between 15 and 60 microns, with most preferably a mean particle size of about 25 microns.

Prior to spraying the substrate surface may be cleaned using the reverse arc transfer process which is well known to those skilled in the art to remove contaminants from the substrate surface. The bond coat is then applied to a thickness preferably between 5 and 10 mils. Most preferably the thickness is from 6 to 8 mils, but broadly coatings as thin as 4 mils can be used at some debit to overall seal life and coatings as thick as 15 mils can be applied, but these thicker bond coats are not generally preferred because they add weight without significantly improving performance. During the application of the bond coat the substrate is heated to a temperature on the order of 1700° F., broadly from 1500° to 1900° F.

Next the porous ceramic abradable layer is applied which comprises zirconia stabilized with 6 to 8% yttria. The use of this material is crucial to the success of the coating system since it provides a tough multi-phase ceramic structure. This ceramic material is plasma sprayed, preferably in air and the substrate temperature is maintained at less than 500° F.

The ceramic particle size can be from about 5 microns to about 175 microns and preferably of about 50 microns mean diameter. Porosity is intentionally created within the ceramic abradable coating through the incorporation of a small amount of polyester or lucite powder with the ceramic. The use of 1.5 to 3.0 weight percent polyester powder (60 micron nominal particle size) with the ceramic produces a porosity on the order of 20–30%. We currently prefer the use of 1.5% to 3% weight polyester with the resultant 20 to 30 vol. % porosity, but we have used 5% polyester which produces about 35% vol. % porosity without difficulty. High porosity levels, in excess of about 35 vol. %, produce coatings prone to erosion damage. Porosity levels of less than about 20 vol. % are unsatisfactory because they cause excess blade tip wear. Most preferably the porosity is about 21–27 vol. %.

The thickness of the ceramic coating ranges from 25 to 50 mils preferably from 25 to 35 mils. Coating thicknesses less than about 25 mils do not provide sufficient range of rub tolerance during normal engine operation, i.e. the turbine blade tips can rub completely through the ceramic and interact with the underlaying bond coat and substrate with undesirable results. Coating thickness much in excess of about 50 mils are prone to spallation.

Following the deposition of the ceramic coat the intermixed polyester residue is removed by heating i.e. for 30 minutes at 1100° F. to 1300° F. in air, and the ceramic coated substrate is then heat treated for one to ten hours at 1800° F. to 2050° F. (4 hours at 1975° F. being preferred) in a nonoxidizing atmosphere to maximize the strength of the bond coat to the substrate. While the bond coat adherence heat treatment is conventionally applied after the ceramic coating has been applied, it could be preformed prior to the ceramic deposition step.

The previously described ceramic coating interacts with blade tips which preferably have an abrasive portion at their immediate free end. The preferred abrasive is silicon carbide which can be applied by a variety of techniques as described in U.S. Pat. Nos. 4,386,112; 4,610,698; and 4,689,242. We prefer to use silicon carbide particles coated with alumina (see U.S. Pat. Nos. 4,249,913 and 4,741,973) in a high temperature metal matrix (see U.S. Pat. Nos. 4,610,698; 4,735,656; and 4,744,725). The alumina coating on the silicon carbide reduces interaction between the silicon carbide and the matrix material which would otherwise occur. We do not rule out the use of other abrasives including cubic boron nitride. The engine design is controlled such that the nominal gap between the seal substrate and the blade tip in engine operation ranges from greater than 0 mils to less than the thickness of the ceramic coating and preferably a 10 mil zone free from rub interaction will be found both inward of the bond coat and outward of the ceramic coating free surface.

The present coating is advantageous in that it is simple to apply, is lighter in weight, less costly, has fewer interfaces for failure initiation, and contains only one ceramic composition. The particular ceramic employed is very durable at the temperature involved and provides a great deal of thermal insulation thereby protecting the metal shoe structure. Should failure occur for any reason the total gap which could result is much smaller than that which would result from failure of a 150 mils thick seal.

Although this invention has been shown and described with respect to detailed embodiments thereof, it will be understood by those skilled in the art that various changes in form and detail thereof may be made without departing from the spirit and scope of the claimed invention.

We claim:

1. A gas turbine engine abradable seal system comprising:
    a seal assembly and a cooperating interacting turbine component wherein said seal assembly includes;
    superalloy seal substrate,
    a metallic MCrAlY bond coat on the surface of said substrate having a thickness of from about 5 to about 10 mils,
    a porous ceramic abradable layer on the surface of said bond coat, said porous ceramic abradable layer consisting essentially of zirconia stabilized with from about 6 to about 8% yttria, said porous ceramic abradable layer containing porosity of from about 20 to 35 vol. %, and having a thickness of from about 25 to about 50 mils, and
    said turbine component includes;
    a turbine component, having an abrasive coating on a portion thereof, positioned located and adapted for motion, relative to said seal assembly, so that said abrasive coating can interact with said porous ceramic abradable to provide sealing.

* * * * *